(12) United States Patent
Vesely

(10) Patent No.: US 11,921,295 B1
(45) Date of Patent: Mar. 5, 2024

(54) EYEWEAR WITH LENSES FOR REDUCED DISCREPANCY BETWEEN ACCOMMODATION AND CONVERGENCE

(71) Applicant: Tanzle, Inc., Scotts Valley, CA (US)

(72) Inventor: Michael A. Vesely, Scotts Valley, CA (US)

(73) Assignee: Tanzle, Inc., Scotts Valley, CA (US)

( * ) Notice: Subject to any disclaimer, the term of this patent is extended or adjusted under 35 U.S.C. 154(b) by 0 days.

(21) Appl. No.: 17/877,055

(22) Filed: Jul. 29, 2022

Related U.S. Application Data

(60) Provisional application No. 63/227,985, filed on Jul. 30, 2021.

(51) Int. Cl.
  *G02B 27/01* (2006.01)

(52) U.S. Cl.
  CPC .. *G02B 27/0179* (2013.01); *G02B 2027/0134* (2013.01); *G02B 2027/0187* (2013.01)

(58) Field of Classification Search
  CPC ........ G02B 27/0179; G02B 2027/0134; H04N 13/00
  See application file for complete search history.

(56) References Cited

U.S. PATENT DOCUMENTS

| | | | | |
|---|---|---|---|---|
| 5,381,191 A | * | 1/1995 | Levy | G02C 7/14 351/57 |
| 8,696,116 B2 | * | 4/2014 | Gottlieb | G02C 7/14 351/159.73 |
| 9,674,498 B1 | * | 6/2017 | Mukherjee | H04N 13/00 |

* cited by examiner

Primary Examiner — Roy P Rabindranath
(74) Attorney, Agent, or Firm — Fish & Richardson P.C.

(57) ABSTRACT

A stereoscopic display includes a headset having a housing shaped to fit on the front of a user's face, right and left displays secured to the housing so as to be positioned before the right and left eyes of the user when the headset is worn, right and left throw lenses positioned before the left and right displays to throw images of the right and left displays to a throw distance, and right and left prism lenses positioned before the right and left displays. The right and left lenses are shaped to shift images of the right and left displays as seen by the right and left eyes inwardly toward a midline such that the vergence of the left/right eyes converge towards the center at the throw distance of the thrown display plane.

18 Claims, 5 Drawing Sheets

EYEWEAR WITH LENSES FOR REDUCED DISCREPANCY BETWEEN ACCOMMODATION AND CONVERGENCE

CROSS-REFERENCE TO RELATED APPLICATIONS

This application claims the benefit of priority to U.S. Application No. 63/227,985, filed on Jul. 30, 2021, the contents of which are hereby incorporated by reference.

BACKGROUND

Technical Field

This disclosure relates to eyewear for stereoscopic displays.

Description of Related Art

Three dimensional (3D) capable electronics and computing hardware devices and real-time computer-generated 3D computer graphics have been a popular area of computer science for the past few decades, with innovations in visual, audio, tactile and biofeedback systems. Much of the research in this area has produced hardware and software products that are specifically designed to generate greater realism and more natural computer-human interfaces. These innovations have significantly enhanced and simplified the end-user's computing experience.

Two dimensional pictures must provide a numbers of cues of the third dimension to the brain to create the illusion of three dimensional images. This effect of third dimension cues can be realistically achievable due to the fact that the brain is quite accustomed to it. The three dimensional real world is always and already converted into two dimensional (e.g., height and width) projected image at the retina, a concave surface at the back of the eye. And from this two dimensional image, the brain, through experience and perception, generates the depth information to form the three dimension visual image from two types of depth cues: monocular (one eye perception) and binocular (two eye perception). In general, binocular depth cues are innate and biological while monocular depth cues are learned and environmental.

Stereoscopic display systems show different images to the right and left eyes of the user. For example, a headset can place a right and left displays before the respective right and left eyes of the user. The difference between the two images seen by the two eyes results in the user experiencing a three dimensional scene with depth information.

SUMMARY

A stereoscopic display includes a headset having a housing shaped to fit on the front of a user's face, right and left displays secured to the housing so as to be positioned before the right and left eyes of the user when the headset is worn, right and left throw lenses positioned before the left and right displays to throw images of the right and left displays to a throw distance, and right and left prism lenses positioned before the right and left displays. The right and left lenses are shaped to shift images of the right and left displays as seen by the right and left eyes inwardly toward a midline such that the vergence of the left/right eyes converge towards the center at the throw distance of the thrown display plane.

Implementations may include one or more of the following potential advantages. Conflict between eye vergence and eye accommodation can be reduced. Discomfort and fatigue from use of stereoscopic displays can be reduced.

BRIEF DESCRIPTION OF THE DRAWINGS

A better understanding of the present disclosure can be obtained when the following detailed description of the preferred embodiment is considered in conjunction with the following drawings, in which.

DETAILED DESCRIPTION

Figure 1:
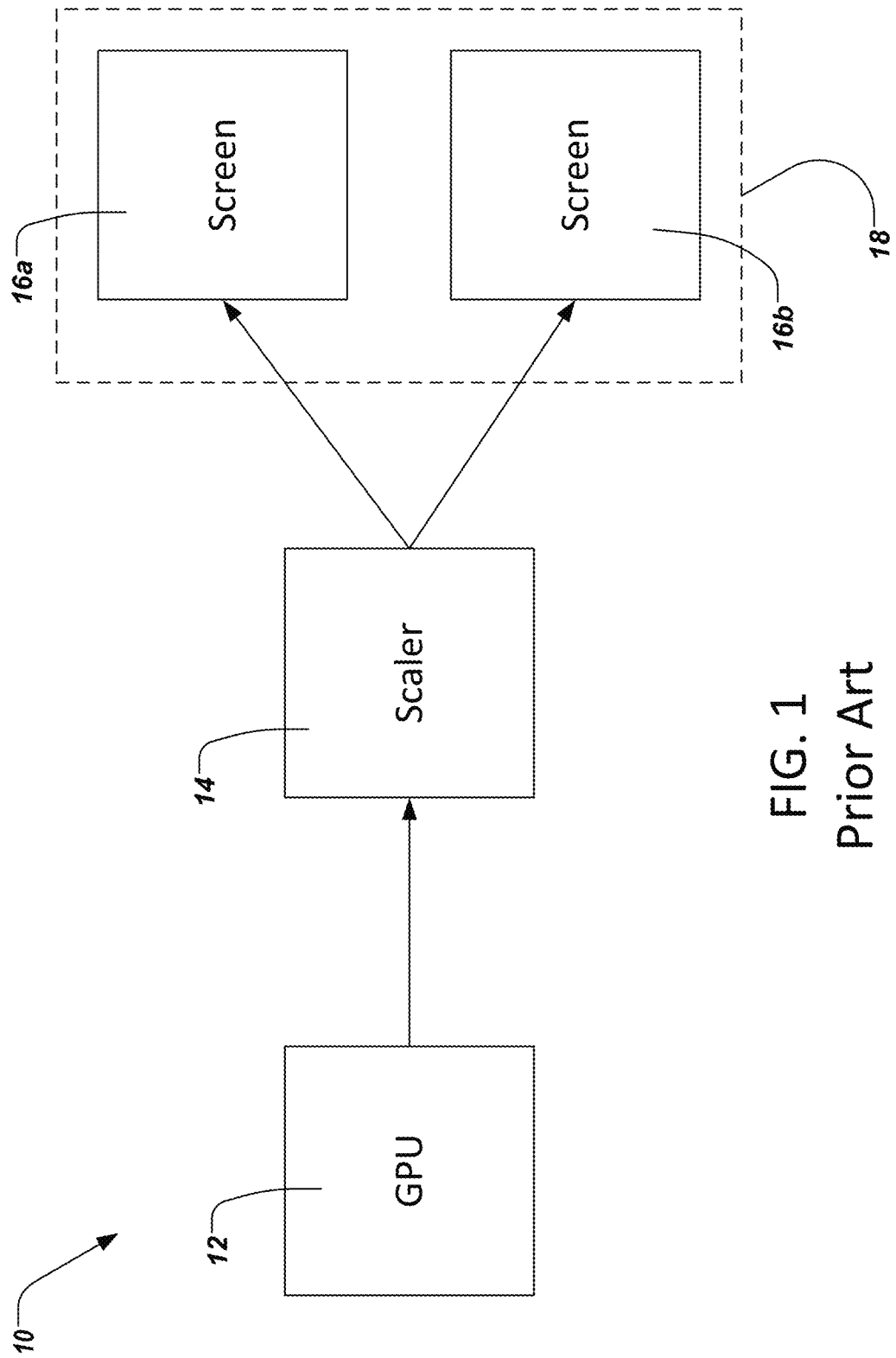
FIG. 1 presents a prior art display chain.

FIG. 1 illustrates a conventional display chain 10 for a 3D display headset, which includes the following components:

1. Graphics Processing Unit (GPU). The GPU 12 typically resides on a personal computer, workstation, or equivalent, and outputs video levels for each color or channel of a supported color model, e.g., for each of three colors, typically Red (R), Green (G), and Blue (B), for each pixel on the display. Each of these numbers is typically an 8 bit number, with a range of to 255, although other ranges are possible.

2. Scaler. The scaler 14 is a video processor that converts video signals from one display resolution to another. This component takes as input the video levels (e.g., for R, G, and B) for each pixel output from the GPU, and processes them in various ways, before outputting (usually) modified video levels for RGB in a format suitable for the panel, usually in the same 8-bit range of 0-255. The conversion can be a scaling transformation, but can also possibly include a rotation or other linear or non-linear transformation. The transformation can also be based on a bias of some statistical or other influence. The scaler 14 can be a component of a graphics card in the personal computer, workstation, etc.

3. Panels. A pair of display panels 16a, 16b, placed on a headset so as to be positioned before the user's eyes during use.

Figure 2:
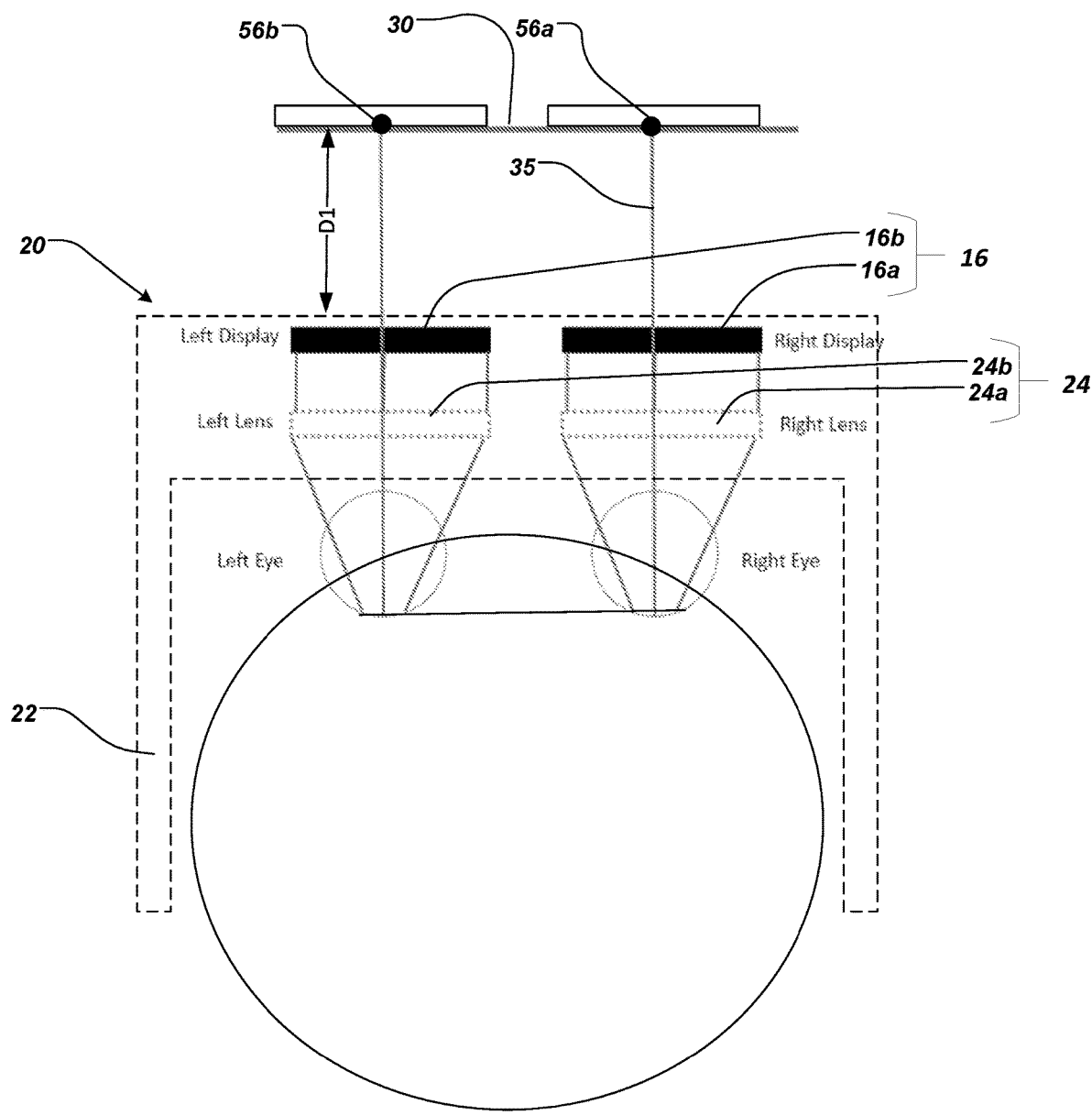
FIG. 2 presents a prior art stereoscopic display headset.

FIG. 2 illustrates a conventional stereoscopic display headset 20. The headset 20 includes a "frame" 22, e.g., a set of goggles, glasses, or other suitable headwear that will fit on the head of a user. The frame 18 supports pair of displays 16, i.e., a right display 16a and a left display 16b, before the user's eyes. The distance between the displays 16a, 16b can be selected based on the interpupillary distance (IPD) of the user, e.g., the distance between the centers of the displays can equal the IPD (or equal the average human IPD). The average IPD for humans is 64 millimeters, with a range of 54 to 72 millimeters. The display panels can be liquid crystal display (LCD) screens, but other display screens are possible. The distance 16a, 16b can be equidistant from the midline through the frame.

In addition, a pair of throw lenses 24, i.e., a right throw lens 24a and a left throw lens 24b (each of which could include multiple lens elements), are supported by the frame 18 between the user's eyes and the respective right and lefts displays 16a, 16b. The throw lenses 24 serve to push out the focal point of the display for each eye so as to shift the image of the displays 16 to a thrown image plane 30. The thrown image plane 30 also provides the zero-parallax plane, i.e., a plane in which the images for the left and right eyes would be the same. The apparent display plane 30 can be at a distance D1 of, for example, three to seven feet or greater from the displays 16.

The difference between the two images on the displays 16a, 16b seen by the two eyes of the user results in the user experiencing a three dimensional scene with depth information. However, this viewing mechanism is different from how eyes normally capture and perceive natural three dimensional scenes. Viewing stereoscopic content on a stereoscopic display headset sometimes triggers unpleasant feelings of discomfort or fatigue in the viewer.

Figure 3:
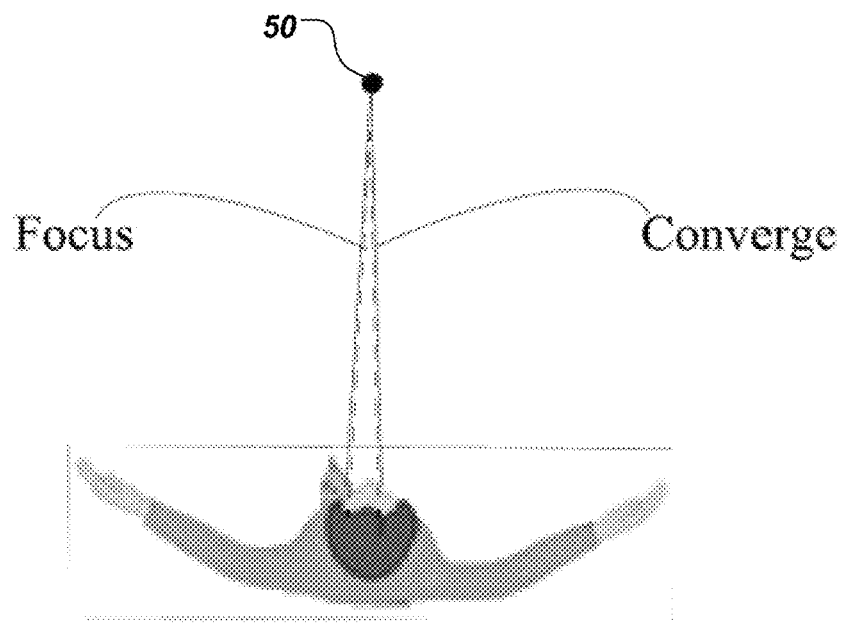
FIG. 3 presents a person focusing and converging on an object.

As shown in FIG. 3, when a person sees an object (represented by point 50) in the physical world, the person's eyes verge (e.g., converge or diverge), i.e., shift toward or away from the midline, to look at the object. This "toe in" affect takes place increasingly as a viewed object moves from at least 40 feet away to nearly in front of the face. Additionally, as the two eyes verge on the object, each eye's lens also focuses on the object. In this sense, both eyes focus and converge on the object in tandem.

Figure 4:
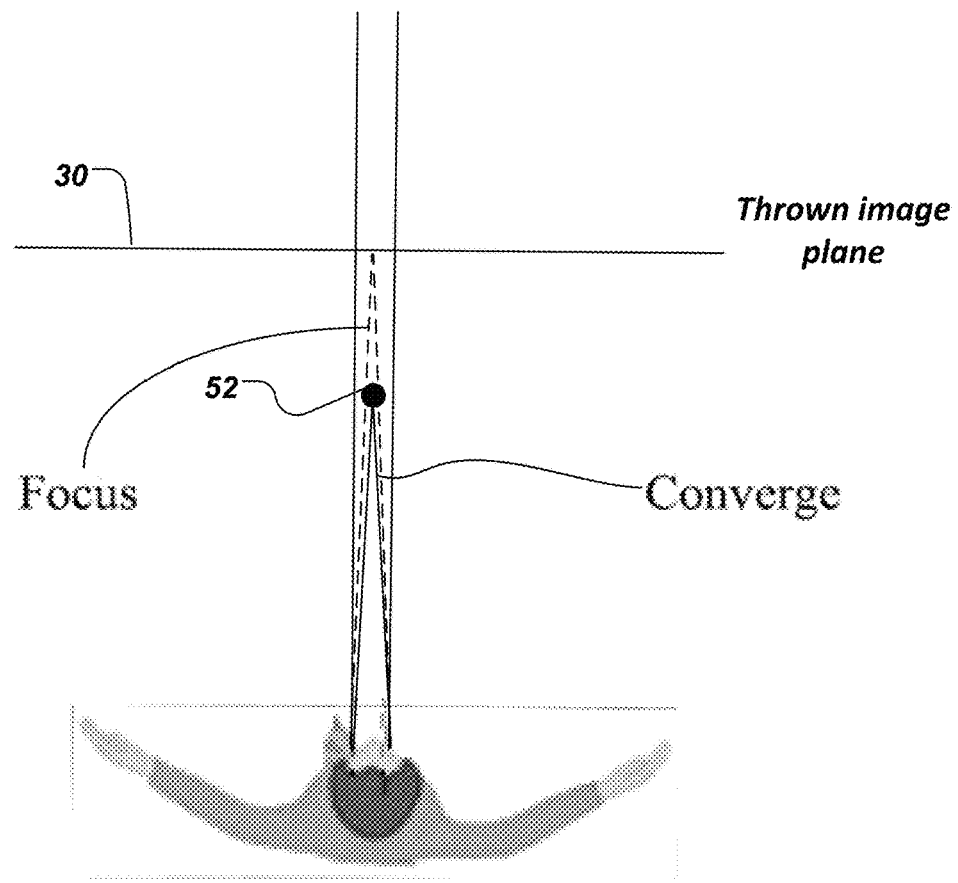
FIG. 4 presents a person focusing on a 3D stereoscopic display while converging on virtual content in front of the display.

In contrast, as shown in FIGS. 2 and 4, when using a stereoscopic display headset, eye focus accommodates to the 3D stereoscopic display focal plane 30 as that is the physical object that the eyes focus. In addition, the display screens are coplanar and essentially normal (or 0 degree offset to the eye for each eye) to sightlines 35 that project "straight ahead" from the left and right eyes. In addition, the lateral distance between the displays is selected, e.g., based on the average user inter-pupillary distance and under the assumption that the displayed images are not artificially laterally shifted, such that given lines 35a connecting the right and left eye to respective center points of the respective thrown images of the right and left display, the lines are substantially parallel. As a result, the natural vergence of the eyes for the zero parallax plane 30 is essentially parallel. Although the eyes will converge or diverge at various depths in order see the imaged object (represented by point 52), the amount of vergence that the eyes experience (i.e., shifting from parallel for an infinite vergence plane to a certain angle for the imaged object) will have a significant discrepancy from the accommodation (at the display focal plane 30). The discrepancy between the natural vergence plane at infinity and the position of the imaged objects can cause discomfort, e.g., eye strain.

What is desired is a display system and processing technique that reduces the discomfort and/or fatigue for stereoscopic images.

By placing appropriate prism lenses in the eyewear, eye vergence can be artificially forced, such that when eyes focus on the zero parallax plane, e.g., at relatively close distances that occur in virtual reality environments, the eyes' vergence more closely matches accommodation. Therefore the vergence that occurs when the user is viewing virtual objects that are rendered to be perceived before or behind the zero parallax display plane are closer to the affect of the real physical world.

Terms

The following is a list of terms used in the present application:

Display—may include the display surface or surfaces or display planes of any technically feasible display device or system type, including but not limited to the display surface of a light-emitting diode (LED) display, a digital light (DLP) or other projection displays, a liquid crystal display (LCD), optical light emitting diode display (OLED), laser-phosphor display (LPD) and/or a stereo 3D display all arranged as a single stand alone display, head mounted display or as a single or multi-screen tiled array of displays. Display sizes may range from smaller handheld or head mounted display devices to full wall displays, which may or may not include an array of display devices.

Viewpoint—This term has its ordinary meaning in the field of computer graphics/cameras and specifies a location and/or orientation. For example, the term "viewpoint" may refer to a single point of view (e.g., for a single eye) or a pair of points of view (e.g., for a pair of eyes). Thus, the term "viewpoint" may encompass a the view from a single eye two points of view from a pair of eyes. A "single viewpoint" may specify that the viewpoint refers to only a single point of view, and a "paired viewpoint" or "stereoscopic viewpoint" may specify that the viewpoint refers to two points of view (and not one). Where the viewpoint is that of a user, this viewpoint may be referred to as an eyepoint (see below) or "physical viewpoint". The term "virtual viewpoint" refers to a viewpoint from within a virtual representation or 3D scene.

Eyepoint—the physical location (and/or orientation) of a single eye or a pair of eyes. A viewpoint may correspond to the eyepoint of a person. For example, a person's eyepoint has a corresponding viewpoint.

Normal Perspective—a perspective which is rendered for a viewpoint which is substantially perpendicular to the display surface. "Substantially perpendicular" may refer to 90 degrees or variations thereof, such as 89 and 91 degrees, 85-95 degrees, or any variation which does not cause noticeable distortion of the rendered scene. A vertical perspective may be a central perspective, e.g., having a single (and central) vanishing point.

As used herein, a vertical perspective may apply to a single image or a stereoscopic image. When used with respect to a stereoscopic image (e.g., presenting a stereoscopic image according to a vertical perspective), each image of the stereoscopic image may be presented according to the vertical perspective, but with differing single viewpoints.

Position—the location or coordinates of an object (either virtual or real). For example, position may include x, y, and z coordinates within a defined space. The position may be relative or absolute, as desired. Position may also include yaw, pitch, and roll information, e.g., when defining the orientation of a viewpoint and/or object within a scene or the scene itself.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Disparity— refers to the difference between the left eye and right eye images of a 3D stereoscopic display. Disparity may be described in at least two ways. First, when referring to the display device, i.e., the 3D stereoscopic display, disparity may be described by the number of pixels of separation between corresponding positions of the image, or content, being displayed, or rendered. In other words, the pixels of separation between the left eye and right eye images, or content. Alternatively, or in addition to, when referring to the point of view of the user, disparity may be described by the degree of angular separation between corresponding positions in the images, or content, being displayed, or rendered. In other words, the angular separation between the left eye and right eye images, or content.

Projection—refers the display of a 3D object, or content, on a two dimensional (2D) display. Thus, a projection may be described as the mathematical function applied to objects within a virtual 3D scene to determine the virtual position of the objects within a 3D space that may be defined by the size of the 3D stereoscopic display and the point of view, or eyepoint, of a user.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured To—various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. First, Second, etc. —these terms are used as labels for nouns that they precede, and do not imply any type of ordering (e.g., spatial, temporal, logical, etc.). For example, in a system having multiple tracking sensors (e.g., cameras), the terms "first" and "second" sensors may be used to refer to any two sensors. In other words, the "first" and "second" sensors are not limited to logical sensors 0 and 1.

Based On—this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Exemplary System

Figure 5:
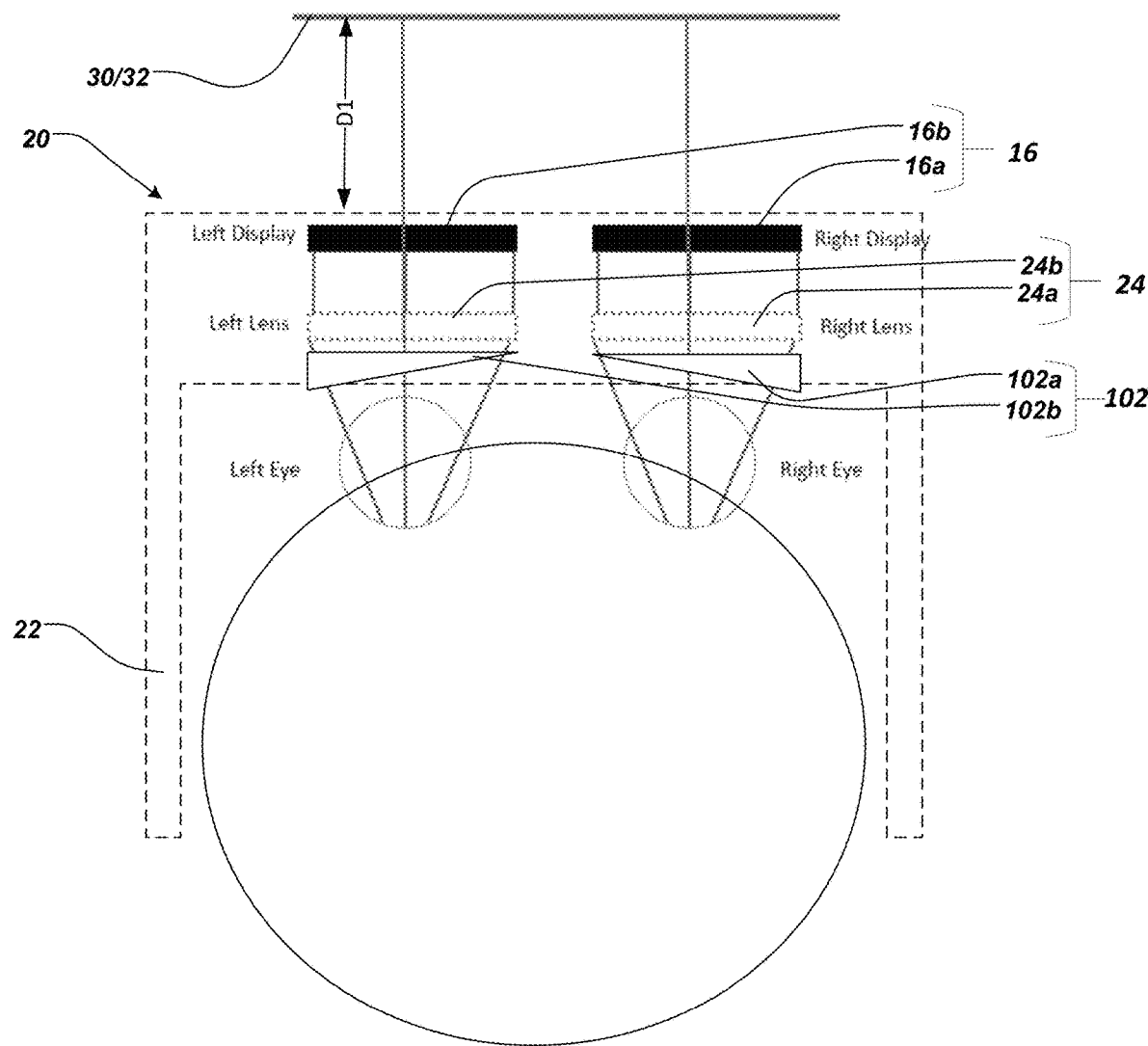
FIG. 5 presents a stereoscopic display headset with prism lenses.

FIG. 5 illustrates a stereoscopic display headset 100 that is similar to the headset 20 described above. However, the headset 100 includes a pair of prisms 102, i.e., a right prism 102a and a left prism 102b, supported by the frame 22 before the user's eyes. In particular, the pair of prisms 102 are supported by the frame 18 between the user's eyes and the respective right and lefts displays throw lenses 24a, 24b.

Figure 6:
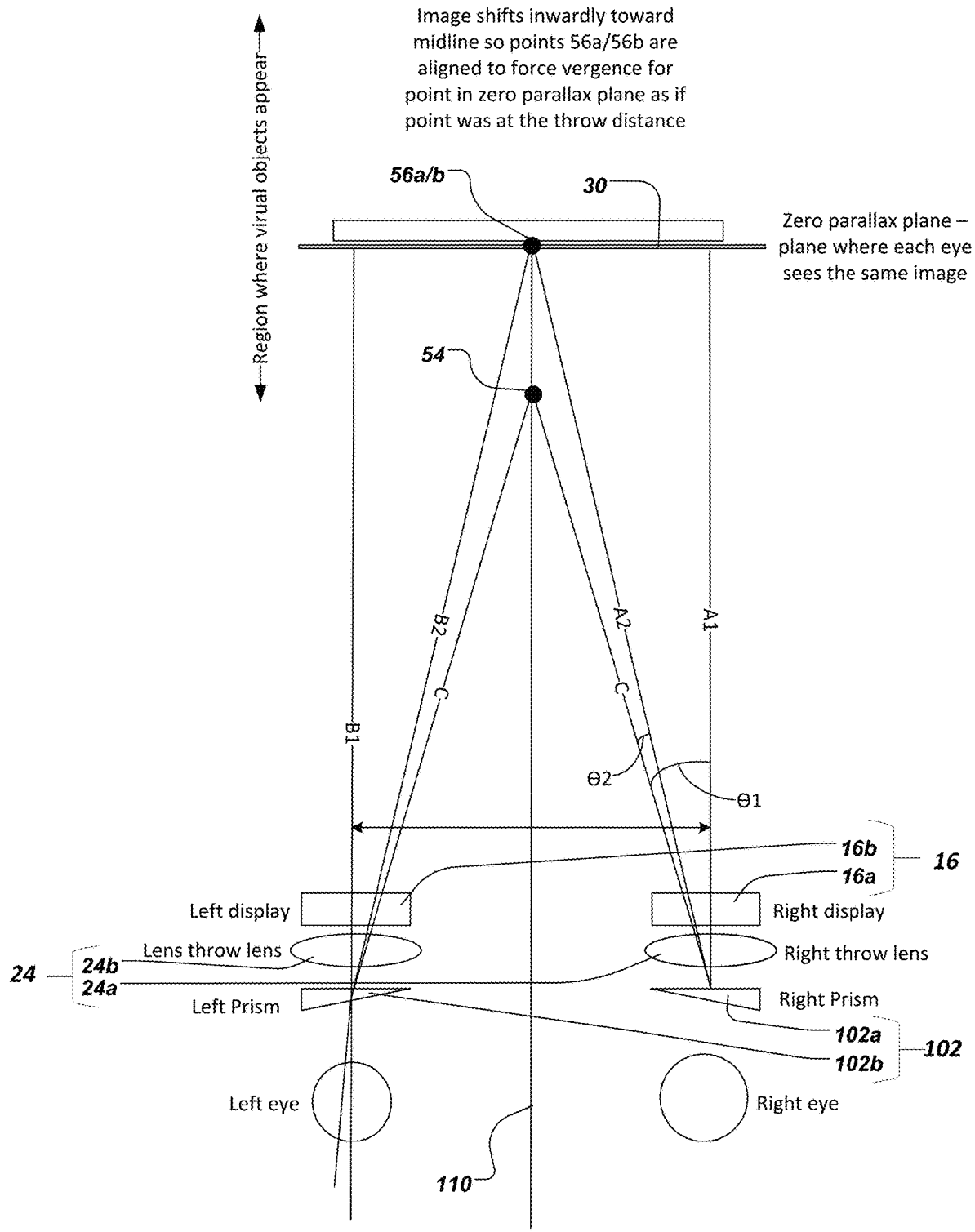
FIG. 6 presents of a reduced discrepancy between accommodation and vergence provided by the stereoscopic display headset of FIG. 5.

Referring to FIG. 6, each prisms 102 serve to shift the apparent thrown position of the associated display 16 inwardly toward a midline 110 between the displays. The prisms can have equal angles such that they shift the apparent thrown position of the associated display 16 inwardly by equal amounts. In particular, the apparent thrown position is shifted such that, for an image displayed in the zero parallax plane 30, the eyes are required to perform vergence to a point 56a/b in substantially the same plane, e.g., within 25%, within 10%, e.g., within 5%, of the distance D1, as the thrown image plane 30. This is illustrated in FIG. 6 by the sightlines A1 and B1 shifting to sight lines A2 and B2 as a result of the prims 102a and 102b, respectively.

As noted above, the eyes will focus on the virtual object 54. This is illustrated in FIG. 6 by the sightlines C. As a result of the induced vergence, instead of the user experiencing a discrepancy between the accommodation and vergence illustrated by angle $\ominus 1$, the user will experience a smaller discrepancy between the accommodation and vergence illustrated by angle $\ominus 2$. As a result, the eyes' vergence more closely matches accommodation, which can reduce eye strain and discomfort. And in particular, for a virtual object positioned in the zero parallax plane, the vergence-accommodation relationship will effectively match the vergence-accommodation relationship of a physical object at the equivalent distance in the real-world (e.g., as shown in FIG. 3).

In review, assuming a person with normal non-strabismus vision, the image is shifted to force a person to toe-in their eyes for accommodating on the thrown display plane at the appropriate distance, when using stereo AR or VR headset. From there the vergence forced upon the user perceiving the rendered virtual objects are still somewhat not matching normal accommodation/vergence pairing, but closer than the prior art systems. Using a prism the dioptre of the prisms for each eyepiece is adjusted based on the thrown focal length of the lenses used for throwing the display image zero parallax ahead of the user's eyes. The prism for each eye is a base out prism, i.e., the thicker edge of the prism is farther from the midline 110. In addition, the surfaces of the prisms farther from the eyes can be parallel to the display surfaces and perpendicular to the midline, whereas the surfaces of the prisms closer to the eyes can be obliquely angled relative to the display surfaces and midline. Thus the image is shifted in towards the nose, causing a toe-in of the eyes to occur. The chosen prism dioptre is then based on the focal length distance that accounts for the visual accommodation of the eyes to the display plane and the IPD of the eye pair. Therefore any selected optical identified distance from the eye to the display plane as well as any IPD are contributors to determining the compensated toe-in of the eyes for each eye's display. Of course, given the identified dioptre, the eyewear lens may have an added prism or an equivalent Fresnel prism lens may be used or a prism may be induced by shifting the eyewear lens off center as per standard optical techniques.

In addition to or instead of the introduction of a prism lens, the center point of the throw lens can be adjusted. In addition to or instead of the introduction of either of these techniques, the displays can be shifted inwardly/outwardly relative to the user's IPD position to a position that would coincide with the shifting in as if performed by the corresponding prism lens. Yet another technique would involve using the conventional AR/VR eyewear, with the display normal to each eye position, but with virtual objects rendered on the displays shifted an amount equal to the shift amount distance as would be performed if the prism lenses were introduced.

CONCLUSION

It should be noted that the above-described embodiments are exemplary only, and are not intended to limit the invention to any particular form, function, or appearance. Moreover, in further embodiments, any of the above features may be used in any combinations desired. In other words, any features disclosed above with respect to one method or system may be incorporated or implemented in embodiments of any of the other methods or systems.

Although the embodiments above have been described, numerous variations and modifications will become apparent to those skilled in the art once the above disclosure is fully appreciated. It is intended that the following claims be interpreted to embrace all such variations and modifications.

I claim:

1. A stereoscopic display, comprising:
a headset having a housing shaped to fit on the front of a user's face;
right and left displays secured to the housing so as to be positioned before the right and left eyes of the user when the headset is worn;
right and left throw lenses positioned before the left and right displays to throw images of the right and left displays to a throw distance, wherein the right and left throw lenses throw the images to an apparent display plane with a distance D1 between the apparent display plane and the right and left displays; and
right and left prism lenses positioned before the right and left displays, the right and left prism lenses shaped to shift images of the right and left displays as seen by the right and left eyes inwardly toward a midline such that the vergence of the left/right eyes converge towards the center at the throw distance of the thrown display plane, wherein and the right and left prism lenses are shaped such that a distance between the apparent display plane and a point of vergence for a virtual object in the apparent display plane is less than 10% of D1.

2. The stereoscopic display of claim 1, wherein the right and left prism lenses are shaped to shift images of the right and left displays as seen by the right and left eyes inwardly by equal amounts.

3. The stereoscopic display of claim 2, wherein the right and left prism lenses are congruent.

4. The stereoscopic display of claim 1, wherein and the right and left prism lenses are shaped such that the distance between the apparent display plane and the point of vergence is less than 5% of D1.

5. The stereoscopic display of claim 1, wherein surfaces of the right and left prism lenses farther from the user's face are coplanar.

6. The stereoscopic display of claim 1, wherein display surfaces of the right and left displays are coplanar.

7. The stereoscopic display of claim 1, wherein the throw distance is three to seven feet.

8. The stereoscopic display of claim 1, further comprising a second prism to accommodate dioptre of a user.

9. A stereoscopic display, comprising:
a headset having a housing shaped to fit on the front of a user's face;
right and left displays secured to the housing so as to be positioned before the right and left eyes of the user when the headset is worn;
right and left throw lenses positioned before the left and right displays to throw images of the right and left displays to a throw distance; and
right and left prism lenses positioned before the right and left displays, the right and left prism lenses shaped to shift images of the right and left displays as seen by the right and left eyes inwardly toward a midline such that the vergence of the left/right eyes converge towards the center at the throw distance of the thrown display plane, wherein surfaces of the right and left prism lenses farther from the user's face are coplanar, and wherein surfaces of the right and left prism lenses farther from the user's face are parallel to the display surfaces of the right and left displays.

10. The stereoscopic display of claim 9, wherein surfaces of the right and left prism lenses closer to the user's face are at an oblique angle relative to the midline.

11. The stereoscopic display of claim 9, wherein display surfaces of the right and left displays are coplanar.

12. The stereoscopic display of claim 9, wherein the throw distance is three to seven feet.

13. The stereoscopic display of claim 9, further comprising a second prism to accommodate dioptre of a user.

14. A stereoscopic display, comprising:
a headset having a housing shaped to fit on the front of a user's face;
right and left displays secured to the housing so as to be positioned before the right and left eyes of the user when the headset is worn;
right and left throw lenses positioned before the left and right displays to throw images of the right and left displays to a throw distance; and
right and left prism lenses positioned before the right and left displays, the right and left prism lenses shaped to shift images of the right and left displays as seen by the right and left eyes inwardly toward a midline such that the vergence of the left/right eyes converge towards the center at the throw distance of the thrown display plane, wherein surfaces of the right and left prism lenses farther from the user's face are coplanar, and wherein surfaces of the right and left prism lenses closer to the user's face are at an oblique angle relative to the midline.

15. The stereoscopic display of claim 14, wherein surfaces of the right and left prism lenses farther from the user's face are parallel to the display surfaces of the right and left displays.

16. The stereoscopic display of claim 14, wherein display surfaces of the right and left displays are coplanar.

17. The stereoscopic display of claim 14, wherein the throw distance is three to seven feet.

18. The stereoscopic display of claim 14, further comprising a second prism to accommodate dioptre of a user.

* * * * *